Patented Nov. 21, 1933

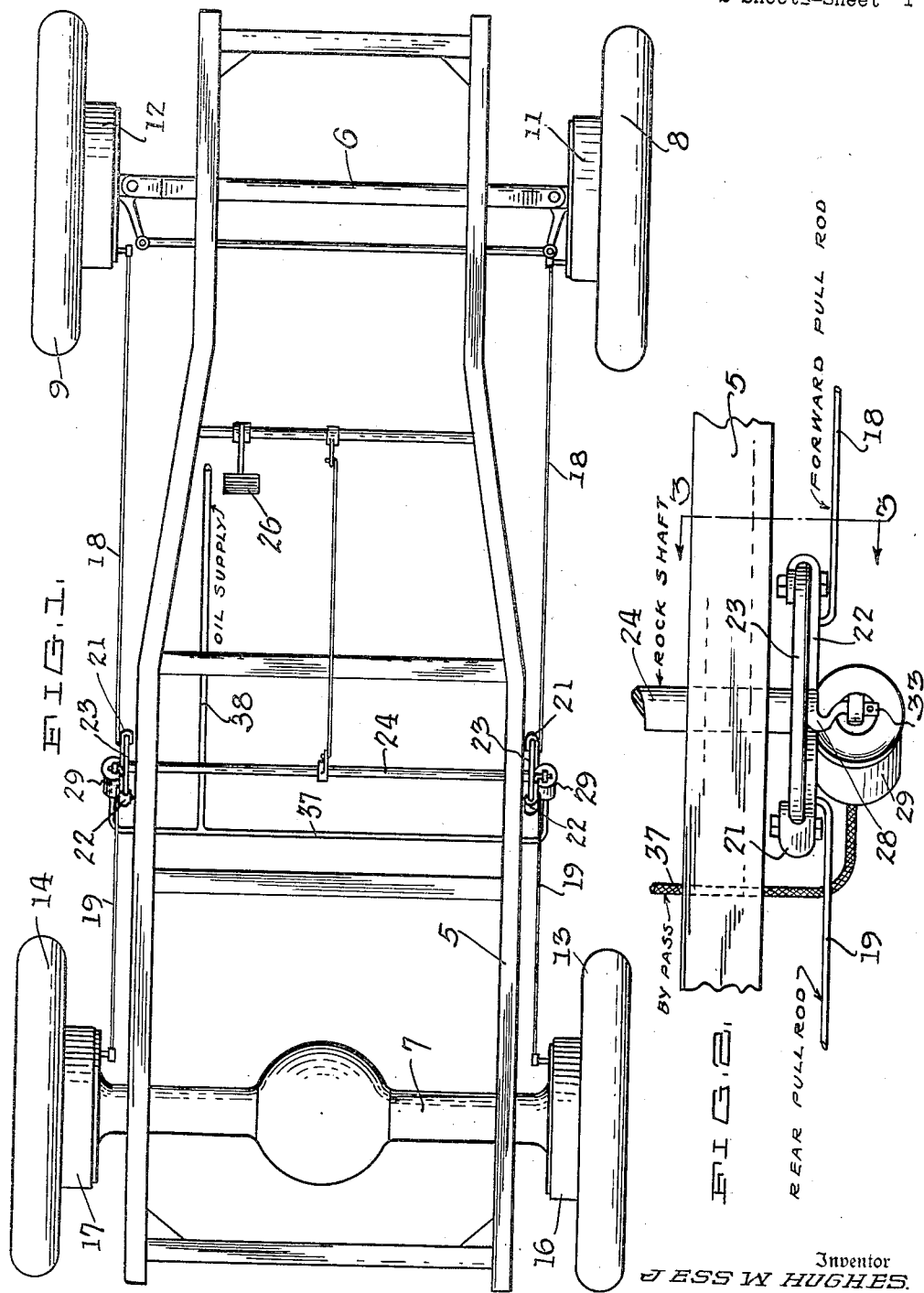

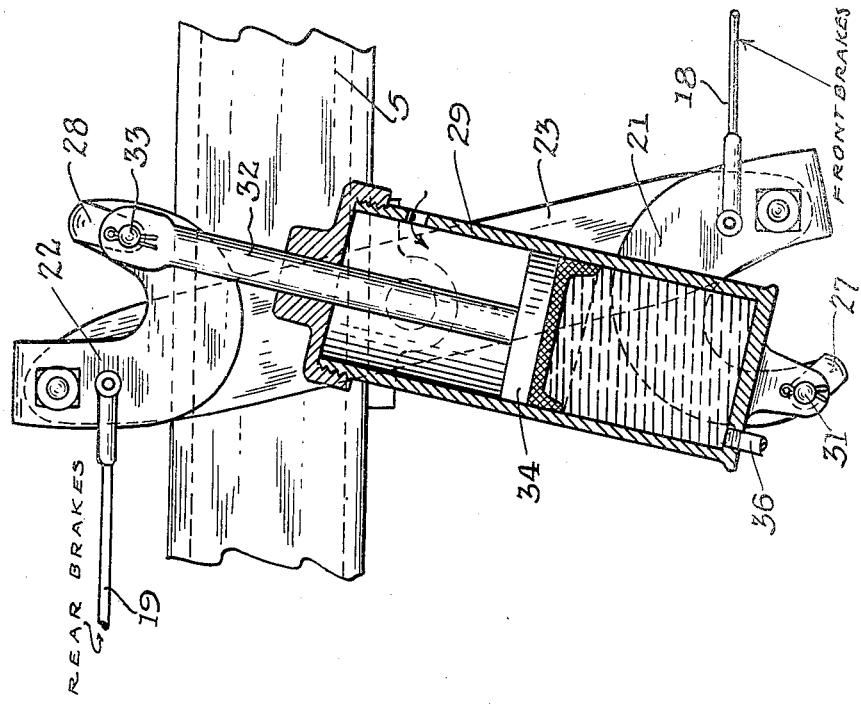
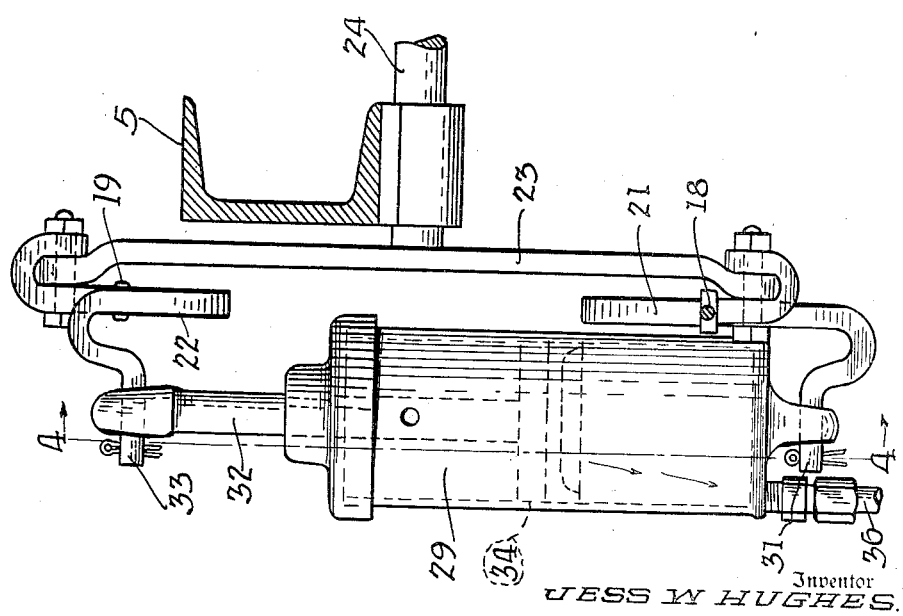

1,936,511

UNITED STATES PATENT OFFICE 1,936,511

BRAKE EQUALIZER

Jess W. Hughes, San Luis Obispo, Calif., assignor of forty per cent to Edward Defreese, San Luis Obispo, Calif.

Application June 17, 1932. Serial No. 617,850

2 Claims. (Cl. 188—204)

This invention relates to improvements in brake equalizers.

The principal object of the invention is to provide means whereby equal pressure will be exerted upon all of the brakes of a four-wheel vehicle.

A further object is to produce a device which is economical to manufacture.

A further object is to produce a device which may be applied to any vehicle now in use, without materially altering its construction.

A still further object is to produce a device which is readily adjusted to take up for wear.

Other objects and advantages will be apparent during the course of the following description.

In the accompanying drawings forming a part of this specification and in which like numerals are employed to designate like parts throughout the same, Fig. 1 is a top plan view of a vehicle chassis having my invention applied thereto, Fig. 2 is a top plan view of Fig. 3, Fig. 3 is an end elevation taken on the line 3—3 of Fig. 2, and Fig. 4 is a side elevation of Fig. 2.

It is an extremely difficult matter to adjust all of the connecting rods and the like parts on a vehicle having four-wheel brakes, so as to have all the brakes exert the same braking effort when the brake pedal is pressed. With applicant's device the brakes on one side of the vehicle equalize with each other and the brakes upon the opposite side of the vehicle are equalized against each other, the result being that as soon as this equalization takes place, which is automatic and very rapid, the same pressure will be exerted upon all of the brakes.

In the accompanying drawings wherein for the purpose of illustration is shown a preferred embodiment of my invention, the numeral 5 designates a vehicle frame having a front axle 6 and a rear axle housing 7. At 8 and 9 I have shown front wheels having brake drums 11 and 12, respectively. The rear wheels 13 and 14 have brake drums 16 and 17, respectively. As both sides of the vehicle are the same, and both equalizers are identical but one equalizer will be described.

Referring now to Figs. 1 and 2 it will be noted that a pull rod 18 extends from the brake shoe within the brake drum 11 and that a pull rod 19 extends from the brake shoe within the brake drum 16. These pull rods 18 and 19 are connected to pivoted members 21 and 22, respectively, which are in turn pivoted to a rocker arm 23 which is connected to a rod 24 suspended from the frame 5. This rod 24 is rotated through the medium of the customary brake pedal 26 and linkage extending from the brake pedal to the rod. The pivoted members 21 and 22 each have offset ends 27 and 28, respectively. A plunger arrangement is connected between these offset ends and consists of a cylinder 29 pivoted as at 31 to the end 27 and a piston rod 32 pivoted as at 33 to the end 28. A piston 34 mounted within the cylinder 29 and connected to the piston rod 32 completes the plunger arrangement and in order to cause an equalization of the brakes upon opposite sides of the vehicle, a pipe 36 connects the cylinder 29 of one side of the vehicle with the similar cylinder on the opposite side of the vehicle. An oil supply pipe 38 is connected to the pipe 37 and to a suitable tank, not shown.

The result of this construction is that when the operator presses on the brake pedal 26, movement is conveyed through the linkage to the rod 24 which when rotated exerts a pull upon the pull rods 18 and 19. As soon as there is any resistance offered to these rods, movement is transmitted tending to compress the fluid confined in the cylinder 29. This compressed fluid will tend to escape through the pipe 36 to a point of least resistance, therefore, the side upon which the brakes take hold first will tend to transfer their resistance to the opposite side of the vehicle, and as a result all of the brakes will be equalized through this differential action, which exists not only between the brakes upon opposite sides of the car, but also between the brakes upon the same side of the car.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In an equalizing device adapted to be attached to a motor vehicle having pull rods for actuating the brakes thereof, of a rocker arm capable of being rotated, a pair of pivoted members secured to the opposite ends of said rocker arms adapted to be connected to said pull rods, an equalizer interposed between the extremities of said pivoted members, said equalizer comprising a piston secured to one of the pivoted members, and a piston and piston rod secured to the other of said pivoted members, said piston being slidable in said cylinder.

2. In an equalizing device adapted to be attached to a motor vehicle having pull rods for actuating the brakes thereof, of a rocker arm capable of being rotated, a pair of pivoted members secured to the opposite ends of said rocker arms adapted to be connected to said pull rods, an equalizer interposed between the extremities of said pivoted members, said equalizer comprising a piston secured to one of the pivoted members, a piston and piston rod secured to the other of said pivoted members, said piston being slidable in said cylinder, and means for introducing a fluid into said cylinder at a point beneath said piston.

JESS W. HUGHES.